(12) United States Patent
Wagiaalla (10) Patent No.: US 10,037,260 B2
(45) Date of Patent: Jul. 31, 2018

(54) SYSTEM FOR EXPRESSION EVALUATION AT DEBUG TIME

(71) Applicant: Red Hat, Inc., Raleigh, NC (US)

(72) Inventor: Sami Wagiaalla, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 61 days.

(21) Appl. No.: 15/168,740

(22) Filed: May 31, 2016

(65) Prior Publication Data

US 2017/0344457 A1    Nov. 30, 2017

(51) Int. Cl.
*G06F 9/44* (2018.01)
*G06F 11/36* (2006.01)

(52) U.S. Cl.
CPC ...... *G06F 11/3624* (2013.01); *G06F 11/3664* (2013.01)

(58) Field of Classification Search
CPC .................. G06F 11/3664; G06F 11/3624
See application file for complete search history.

(56) References Cited

U.S. PATENT DOCUMENTS

| | | | |
|---|---|---|---|
| 7,478,366 B2 | 1/2009 | Bickson et al. | |
| 7,636,913 B2 | 12/2009 | Heydarian et al. | |
| 7,650,593 B2 | 1/2010 | Horton et al. | |
| 7,716,644 B2 | 5/2010 | Horton et al. | |
| 7,730,451 B2 | 6/2010 | Styles et al. | |
| 8,527,961 B2 | 9/2013 | Von Der Ahe et al. | |
| 9,069,574 B2 * | 6/2015 | Greiner | G06F 11/3688 |
| 9,122,794 B2 | 9/2015 | Smiljanic et al. | |
| 9,176,846 B1 | 11/2015 | Fors et al. | |
| 9,208,060 B1 | 12/2015 | Nelson et al. | |
| 2007/0277163 A1* | 11/2007 | Avresky | G06F 8/43 717/140 |
| 2012/0304156 A1* | 11/2012 | Feiveson | G06F 11/3636 717/131 |
| 2015/0234736 A1* | 8/2015 | Koju | G06F 11/3692 717/131 |
| 2016/0112531 A1* | 4/2016 | Milton | G06F 9/5083 709/205 |

OTHER PUBLICATIONS

GDB Debuggin Preferences; http://help.eclipse.org/luna/index.jsp?topic=%2Forg.eclipse.cdt.doc.user%2Freference%2Fcdt_u_dsfgdb.htm.
EEAddIn Sample: Debugging Expression Evaluator Add-In; https://msdn.microsoft.com/en-us/library/8fwk67y3(v=vs.90).aspx.

* cited by examiner

*Primary Examiner* — Camquy Truong
(74) *Attorney, Agent, or Firm* — K&L Gates LLP (57) ABSTRACT

A system for expression evaluation at debug time includes a debugger which receives an executable program with debugging information from a compiler, where the executable program with the debugging information is generated by compiling a source code program and generating debugging information corresponding to the executable program. The compiler embeds at least a first abstract syntax tree of a first expression of the source code program in the debugging information. The debugger receives a first debugging command from a debugger client to evaluate a selected portion of the first expression. The debugger determines one or more nodes of the abstract syntax tree that correspond to the selected portion of the first expression. The debugger then steps through and evaluates the one or more nodes of the abstract syntax tree and returns one or more values generated by the evaluation.

21 Claims, 5 Drawing Sheets

SYSTEM FOR EXPRESSION EVALUATION AT DEBUG TIME

BACKGROUND

The process of debugging applications involves the identification of anomalies or defects in the code of application programs in order to ultimately resolve such issues. As a practical matter, testing an application program may entail observing the program's execution with a development tool called a debugger. A developer may use a debugger to pause and otherwise control the execution of a program. While paused, the developer can typically inspect the state of a program to determine whether the program is functioning as desired or expected.

SUMMARY

The present disclosure provides a new and innovative system, methods and apparatus for expression evaluation at debug time.

In an example, the system includes a memory, one or more processors, in communication with the memory, and a debugger including a user interface module and a debugger engine. An executable program with debugging information is received from a compiler, where the executable program with the debugging information is generated by compiling, by the compiler, a source code program and generating, by the compiler, debugging information corresponding to the executable program, and where the compiler embeds at least a first abstract syntax tree of a first expression of the source code program in the debugging information. The user interface module receives a first debugging command from a debugger client to evaluate a selected portion of the first expression. The debugger then determines one or more nodes of the abstract syntax tree that correspond to the selected portion of the first expression. The debugger steps through and evaluates the one or more nodes of the abstract syntax tree. The debugger then returns one or more values generated by the evaluation of the one or more nodes of the abstract syntax tree.

Additional features and advantages of the disclosed method and apparatus are described in, and will be apparent from, the following Detailed Description and the Figures.

DETAILED DESCRIPTION OF EXAMPLE EMBODIMENTS

Figure 1:
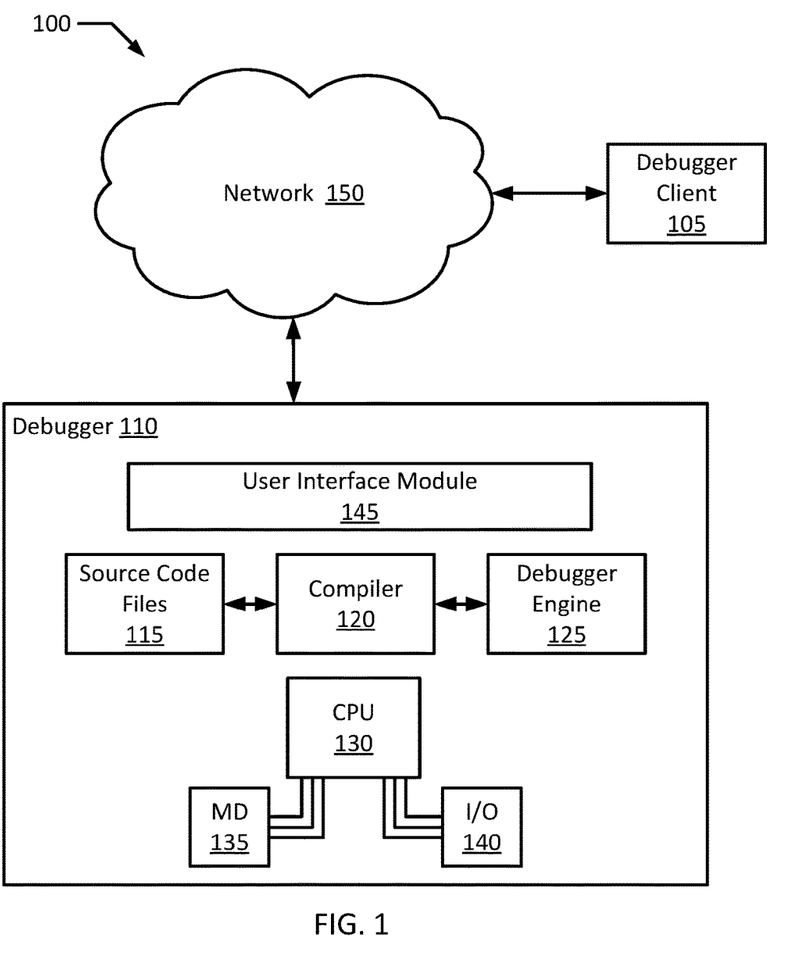
FIG. 1 is a block diagram of an example debugging system according to an example of the present disclosure.

FIG. 1 depicts a block diagram of an example debugging system according to an example embodiment of the present disclosure. When developers are debugging programs, it is often valuable to evaluate expressions in the context of the current execution or state of a program. For example, a developer may want to evaluate an expression at a particular breakpoint in which execution of the program in question has been paused. The present disclosure may advantageously increase the speed and effectiveness of debugging applications. Expression evaluation generally involves determining the value of an expression (e.g., a variable or a function) at one or more points during the execution of a program. Such expression evaluation may require the writing an expression evaluator in the debugger module. The present disclosure may limit the need to write such an expression evaluator in the debugger module by advantageously using debugging information provided by the program compiler. Use of this debugging information also reduces the need for a debugger to remain up to date with specific compiler implementations which may vary between different compilers. In an example, a compiler may embed one or more abstract syntax trees corresponding to one or more expressions within debugging information provided to a debugger. The debugger may then use this debugging information to evaluate an expression of interest to a developer. The present disclosure may accordingly improve debugging efficiency by reducing or eliminating the need to compose expression evaluators for a debugger. Moreover, the present disclosure does not significantly increase the size of the debugging information provided to a debugger.

In an example, computer system 100 includes one or more debugger clients 105 communicating with one or more debuggers 110 over a network 150. For example, the network 150 may be a public network (e.g., the Internet), a private network (e.g., a local area network (LAN) or wide area network (WAN)), or a combination thereof. In an example, the debugger client 105 may include the debugger 110 as part of the same device.

In an example, the debugger 110 may include one or more physical processors (e.g., CPU 130) communicatively coupled to respective memory devices (e.g., MD 135) and input/output devices (e.g., I/O 140). As used herein, physical processor or processor (130) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 135 refers to a volatile or non-volatile memory device, such as RAM, ROM, EEPROM, or any other device capable of storing data. As discussed herein, I/O device 140 refers to a device capable of providing an interface between one or more processor pins and an external device capable of inputting and/or outputting binary data.

Processors 130 may be interconnected using a variety of techniques, ranging from a point-to-point processor interconnect, to a system area network, such as an Ethernet-based network. Local connections within the debugger 110 including, for example, the connections between processor 130 and memory 135 and between processor 130 and I/O device 140 may be provided by one or more local buses of suitable architecture, for example, peripheral component interconnect (PCI).

In an example, the debugger 110 and the debugger client 105 may operate in conjunction to debug one or more application programs. In the illustrated example, the debugger 110 includes a user interface module 145 for interfacing with a debugger client 105, a debugger engine 125, a compiler 120, and a repository of source code files 115. In an example, the compiler 120 and the source code files 115 may be on the debugger client 105 or may be resident on a third computer separate from the debugger 110 and the debugger client 105.

In an example, the debugger engine 125 may be capable of debugging high level source code programs (otherwise referred to herein as "source code programs") written in one or more programming languages including Java, C, C++, C#, Visual Basic, SQL, Pascal, COBOL, BPEL, BPMN, CEP, jBPM, and Drools.

In an example, the user interface module 145 of the debugger 110 provides a set of debugging commands to a user (or developer) via the debugger client 105. For example, a debugging command may include setting a breakpoint, clearing a breakpoint, setting a watchpoint, clearing a watchpoint, setting a catchpoint, clearing a catchpoint, stepping over, stepping into, stepping out, jumping, resuming, running, stopping, getting a variable, getting a source, evaluating an expression, showing stack frame 202 information, etc. In an example, a user can use the debugger client 105 to issue debugging commands to the debugger 110 and receive program execution information via an interface on the debugger client 105 that is provided via the user interface module 145. For example, as described in greater detail below, via the debugger client 105, a user may select an expression and provide a debugging command to the debugger 110 requesting that the expression be evaluated.

In an example, program execution information may include contents of memory locations at a particular stage of execution, a call stack of routines that have been invoked but not yet ended at the particular stage of execution, lists of objects associated with the routines, tracing information describing which instructions are being executed, time profile information describing the execution time of one or more instructions, the results of evaluated expressions and any other information that a user may utilize to troubleshoot the performance of one or more programs. In an example, the debugger client 105 may present a graphical user interface (GUI) received from the user interface module 145 including information about high-level language statements, contents of memory when the high-level language statements are executed, available debugging commands, etc.

In an example, the debugger engine 125 receives debugging commands from the debugger client 105 via the user interface module 145. In an example, the compiler 120 may compile source code files 115 of interest to the user (or developer) and provide an executable program 205 along with debugging information 210 to the debugger engine 125. In an example, the debugger engine 125 holds the state of a running program including the running threads, the stack frame 202 information, and breakpoints set in the program. Accordingly, in an example, the debugger engine 125 may determine the location of a breakpoint in the code of a program and trigger the breakpoint when, while stepping through the program, the breakpoint is hit.

In an example, the user interface module 145, the debugger engine 125, the compiler 120, and the source code file repository 115 may be combined into one module. In an example, the user interface module 145, the debugger engine 125, the compiler 120, and the source code file repository 115 may each be divided into additional separate modules. In an example, above described aspects of each of the user interface module 145, the debugger engine 125, the compiler 120, and the source code file repository 115 may be performed by a different module.

Figure 2A:
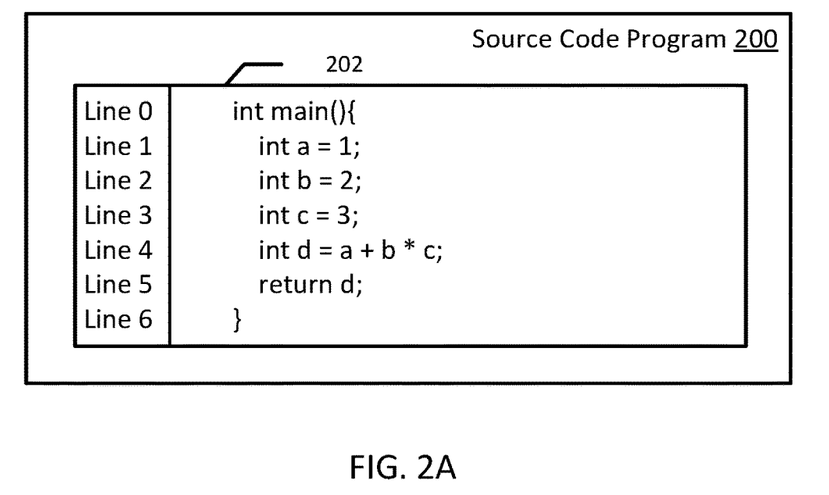
FIG. 2A illustrates an example source code program according to an example of the present disclosure.

FIG. 2A is an example source code program 200 according to an example embodiment of the present disclosure. In an example, FIG. 2A depicts a graphical user interface (GUI) of a frame 202 stack displayed to a user or developer via the debugger client 105. As used herein, a frame 202 generally represents routines that have not yet returned or completed execution. In the illustrated example, the frame 202 displays code in order of execution and represents a function that the user is, for example, interested in debugging.

For example, the debugger 110 may add a frame 202 for int main{ } when the program is invoked. As used herein, an application program may be referenced as an application, a program, a function, a procedure, a subroutine, a routine, code, or any other commonly used equivalent. The debugger 110 may remove a frame 202 the program completes execution and/or returns. In an example, a frame 202 may include additional program execution information not shown in the illustrated example in FIG. 2A, including contents of memory locations at a particular stage of execution, a call stack of routines that have been invoked but not yet ended at the particular stage of execution, lists of objects associated with the routines, tracing information describing which instructions are being executed, time profile information describing the execution time of one or more instructions, the results of evaluated expressions, etc. The debugger 110 may use the user interface module 145 to present a debugger GUI to the debugger client 105. In an example, a user may issue one or more debugging commands to the debugger 110 using the presented debugger GUI. For example, a user may select some portion of the int main{ } function to be evaluated by the debugger 110 by issuing a debugging command to the debugger 110 using the debugger client 105.

Figure 2B:
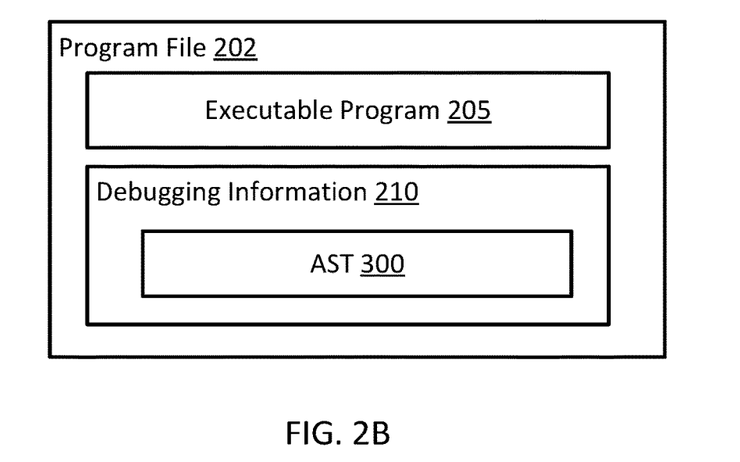
FIG. 2B illustrates an example executable program and debugging information according to an example of the present disclosure.

FIG. 2B illustrates an example executable program 205 and debugging information 210 according to an example embodiment of the present disclosure. In an example, the executable program 205 and debugging information 210 are part of a single program file 203. In another example, the executable program 205 and debugging information 210 are each included in a separate file. For example, the executable program 205 may be in an executable file and the debugging information 210 (and the abstract syntax tree 300) may be in a symbol file.

In an example, a compiler 120 compiles a source code program 200 into an executable program 205 and generates debugging information 210. The compiler 120 may then provide the executable program 205 and the debugging information 210 to a debugger 110 to assist in the process of debugging the source code program 200. In an example, the executable program 205 may be in a number of languages including ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, Zilog Z80 assembly, and machine code. In an example, debugging information 210 provides information regarding the relationship between the original source code program 200 and the executable program 205. For example, debugging information 210 may include a variety of information including the structure of the source code program 200 functions, number of source code program 200 functions, a mapping of the line numbers in the source code program 200 that correspond to the executable program 205, a mapping between function names in the source code program 200 and the address in the executable code where instructions for these functions begin, and/or one or more memory addresses at which expression variables, functions, parameters, constants are located. In addition, the compiler 120 of the present disclosure may generate one or more abstract syntax trees 300 for the one or more expressions in the source code program 200 to be included in the debugging information 210.

Figure 3:
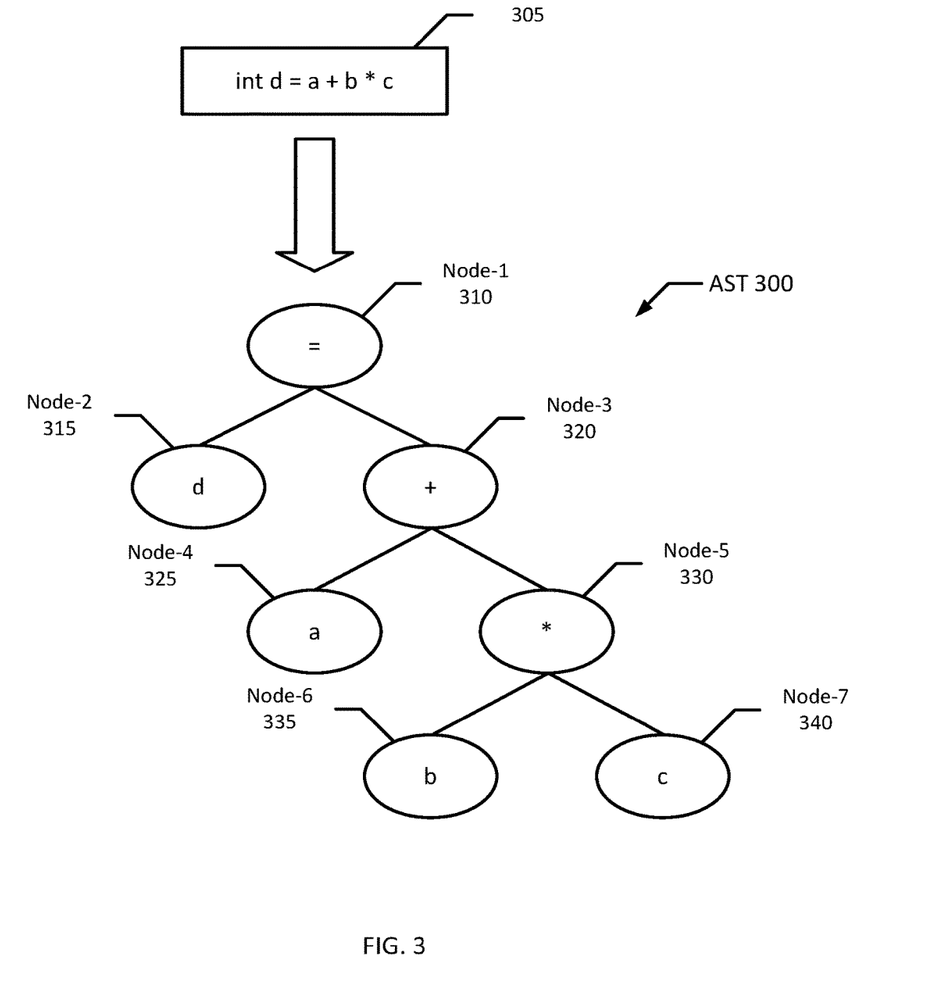
FIG. 3 illustrates an example abstract syntax tree according to an example of the present disclosure.

FIG. 3 illustrates an example abstract syntax tree according to an example of the present disclosure. For example, as illustrated in FIG. 3, abstract syntax tree 300 may be generated by parsing an expression 305 into multiple nodes (otherwise referred to as elements). The example abstract syntax tree 300 is generated by parsing the example expression 305 (int d=a+b*c) into seven nodes (e.g., node-1 310, node-2 315, node-3 320, node-4 325, node-5 330, node-6 335, node-7 340). Each node may be a function call (otherwise referred to as an "operation" node) or a variable. For example, node-1 310, node-3 320, and node-5 330 depict function calls and node-2 315, node-4 325, node-6 335, and node-7 340 depict variables. As described in greater detail below and with respect to FIG. 4, in example embodiments of the present disclosure debugger engine 125 uses the one or more abstract syntax trees 300 provided by the compiler 120 to evaluate a selected expression by stepping through an abstract syntax tree 300 corresponding to the selected expression. In an example, an abstract syntax tree 300 may have greater or fewer nodes depending on the complexity of the expression that it represents. It should be appreciated that the expression 305 is a relatively simple expression used for the purposes of ease of explanation.

Figure 4:
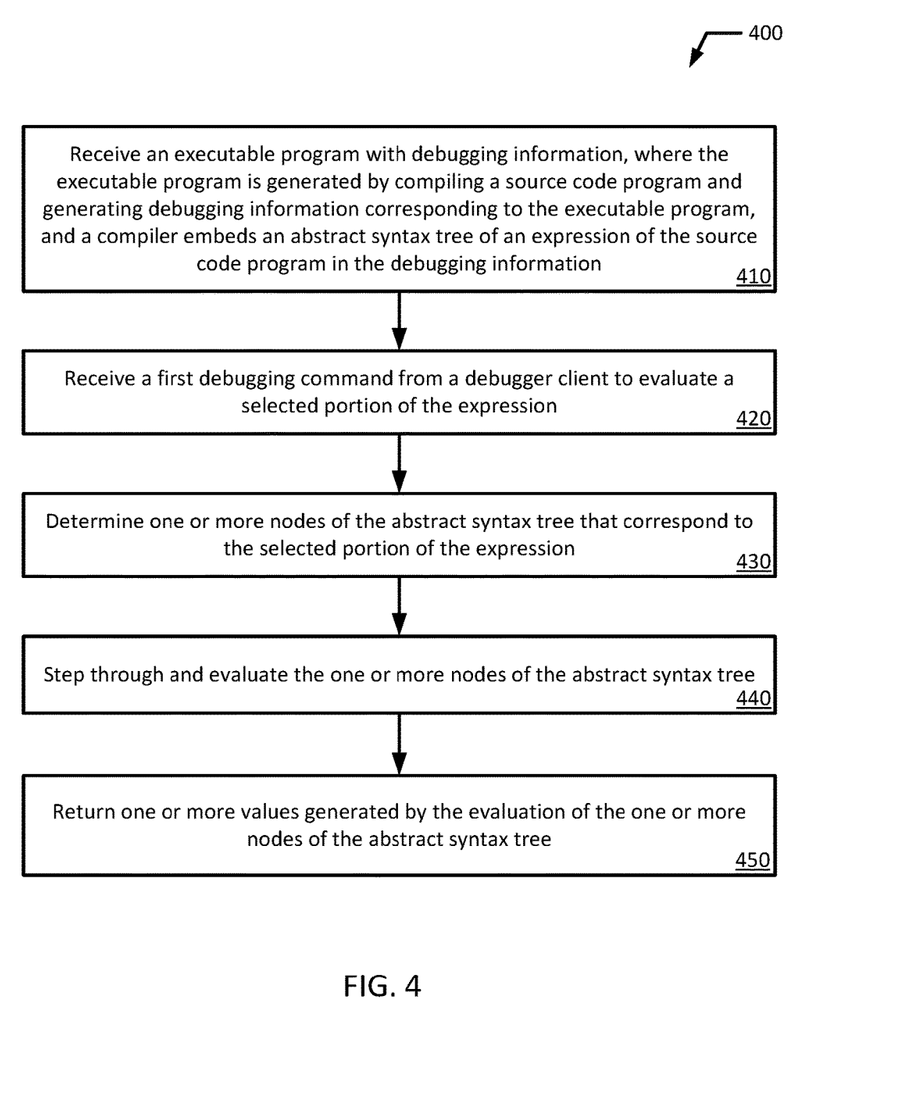
FIG. 4 is a flowchart illustrating an example process for expression evaluation at debug time according to an example of the present disclosure.

FIG. 4 illustrates a flowchart illustrating an example process for expression evaluation at debug time according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both. In an example, the method is performed by a debugger 110.

The example method 400 starts and an executable program 205 and debugging information 210 is received by the debugger 110 (and/or the debugger engine 125) from a compiler 120, where the executable program 205 with the debugging information 210 is generated by compiling, by the compiler 120, a source code program 200 and generating, by the compiler 120, debugging information 210 corresponding to the executable program 205. In an example, the compiler includes at least a first abstract syntax tree 300 of a first expression 305 of the source code program 200 as part of the debugging information 210 (block 410). In an example, the compiler 120 may include, in the debugging information 210, one or more abstract syntax trees 300 for every expression included in the source code program 200 that is being debugged. In an example, the compiler 120 may include, in the debugging information 210, one or more abstract syntax trees for every expression included in the source code program 200 that the compiler 120 has compiled. In an example, the compiler 120 may include, in the debugging information 210, one or more abstract syntax trees 300 for every expression of the source code program 200 that the compiler 120 has evaluated.

In an example, the compiler 120 may additionally include, in the debugging information 210, one or more data structures that map each node in an abstract syntax tree 300 with the expression 305 that the abstract syntax tree 300 represents. In an example, the debugging information 210 may include a data structure for each abstract syntax tree 300 that is included in the debugging information 210. For example, the data structure (mapping each node in an abstract syntax tree 300 with the expression 305 that the abstract syntax tree 300 represents) could be a two dimensional matrix where each cell (or range of cells depending on the length of the variable name) could identify which node in the abstract syntax tree 300 that each variable belongs to.

In an example, the debugging information 210 may additionally include information regarding one or more of the structure of the source code program 200 functions, a number of source code program 200 functions, a mapping of the line numbers in the source code program 200 that correspond to the executable program 205, a mapping between function names in the source code program 200 and the address in the executable code where instructions for these functions begin, and/or one or more memory addresses at which expression variables, functions, parameters, constants are located.

The user interface module 145 (and/or the debugger 110) then receives a first debugging command from a debugger client 105 to evaluate a selected portion of the first expression 305 (block 420). In an example, a user (or developer) may use a debugger GUI presented to the debugger client 105 to select a portion of the first expression 305. In an example, the portion of the first expression 305 that is selected may include a full line of code in the source code program 200 language, multiple lines of code in the source code program 200 language, or part of a line of code in the source code program 200 language. For example, the user may select the entire int main{ } program to be evaluated or may select a line of code to be evaluated such as (int d=a+b*c). The user may also select part of a line of code (that is less than the whole) to be evaluated such as (b*c) or just a variable such as (b).

The debugger 110 (and/or the debugger engine 125) may then determine one or more nodes of the abstract syntax tree 300 that correspond to the selected portion of the first expression 305 (block 430). For example, with reference to the example illustrated in FIG. 3, if the user selected the entire first expression 305 (int d=a+b*c), then the debugger 110 (and/or the debugger engine 125) would determine that the abstract syntax tree 300 and node-1 310, node-2 315, node-3 320, node-4 325, node-5 330, node-6 335, and node-7 340 correspond to the selected first expression 305.

In an example, determining the one or more nodes of the abstract syntax tree 300 that correspond to the selected portion of the first expression 305 includes analyzing, by the debugger 110 (and/or the debugger engine 125), a data structure that includes a mapping between the abstract syntax tree 300 and the first expression 305. In an example, the data structure is included as part of the debugging information 210.

In an example, determining one or more nodes of the abstract syntax tree 300 that correspond to the selected portion of the first expression 305 includes determining whether the selected portion of the first expression 305 is a valid selection. In an example, a valid selection refers to a first expression 305 or a portion of a first expression 305 that can be evaluated using the abstract syntax tree 300. For example, determining that a selection of the first expression 305 is valid may require determining whether a tree or a sub-tree exists on the abstract syntax tree 300 that represents the selection of the first expression 305. For example, with reference to the illustrated example of FIG. 3, if the user selects (b*c) to be evaluated, the debugger 110 would determine that this selection is valid because there exists a sub-tree of the abstract syntax tree 300 including node-5 330, node-6 335, and node-7 340 that represents the selected expression. In another example, with reference to the illustrated example of FIG. 3, if the user selects (a+b) to be evaluated, the debugger 110 would determine that this selection is invalid because no abstract syntax tree 300 or sub-tree exists in the debugging information 210 that represents the selected expression.

In an example, responsive to determining that the selected portion of the first expression 305 is a valid selection, the debugger 110 (and/or debugger engine 125) will determine one or more nodes of the abstract syntax tree 300 that correspond to the selected portion of the first expression 305 (as discussed with respect to step 430) and proceed to block 440. In an example, responsive to determining that the selected portion of the first expression 305 is an invalid selection, the debugger 110 (and/or debugger engine 125) may return to the debugger client 105 an error indicating that the selected portion of the first expression 305 is invalid and/or that it cannot be evaluated.

The debugger 110 (and/or debugger engine 125) then steps through and evaluates the one or more nodes of the abstract syntax tree 300 (block 410). In an example, the debugger 110 (and/or debugger engine 125) steps through and evaluates the one or more nodes of the abstract syntax tree 300 only if the selected portion of the first expression 305 is determined to be a valid selection. In an example, stepping through and evaluating the one or more nodes of the abstract syntax tree 300 includes determining by the debugger 110 (and/or debugger engine 125) whether a first node of the one or more nodes is at least one of a function call and a variable. Responsive to the debugger 110 (and/or debugger engine 125) determining that the first node is a function call, the debugger 110 (and/or debugger engine 125) causes the function call to be executed. In an example, responsive to the debugger 110 (and/or debugger engine 125) determining that the first node is a variable the debugger 110 (and/or debugger engine 125) obtains the value of the variable from its storage location. In an example, the debugger 110 (and/or debugger engine 125) uses the data structure included in the debugging information 210 that includes the mapping between the abstract syntax tree 300 and the first expression 305 to evaluate the variable and/or the function call nodes. For example, with reference to the illustrated example of FIG. 3, if the user selects (b*c) to be evaluated, the debugger 110 (and/or debugger engine 125) will step through and evaluate node-5 330, node-6 335, and node-7 340.

The debugger 110 (and/or debugger engine 125) then returns one or more values generated by the evaluation of the one or more nodes of the abstract syntax tree 300. For example, with reference to the illustrated example of FIG. 3, if the user selects (b*c) to be evaluated, and b=1 and c=2, the debugger 110 (and/or debugger engine 125) will return a 2 as the result of stepping through and evaluating node-5 330, node-6 335, and node-7 340.

Figure 5:
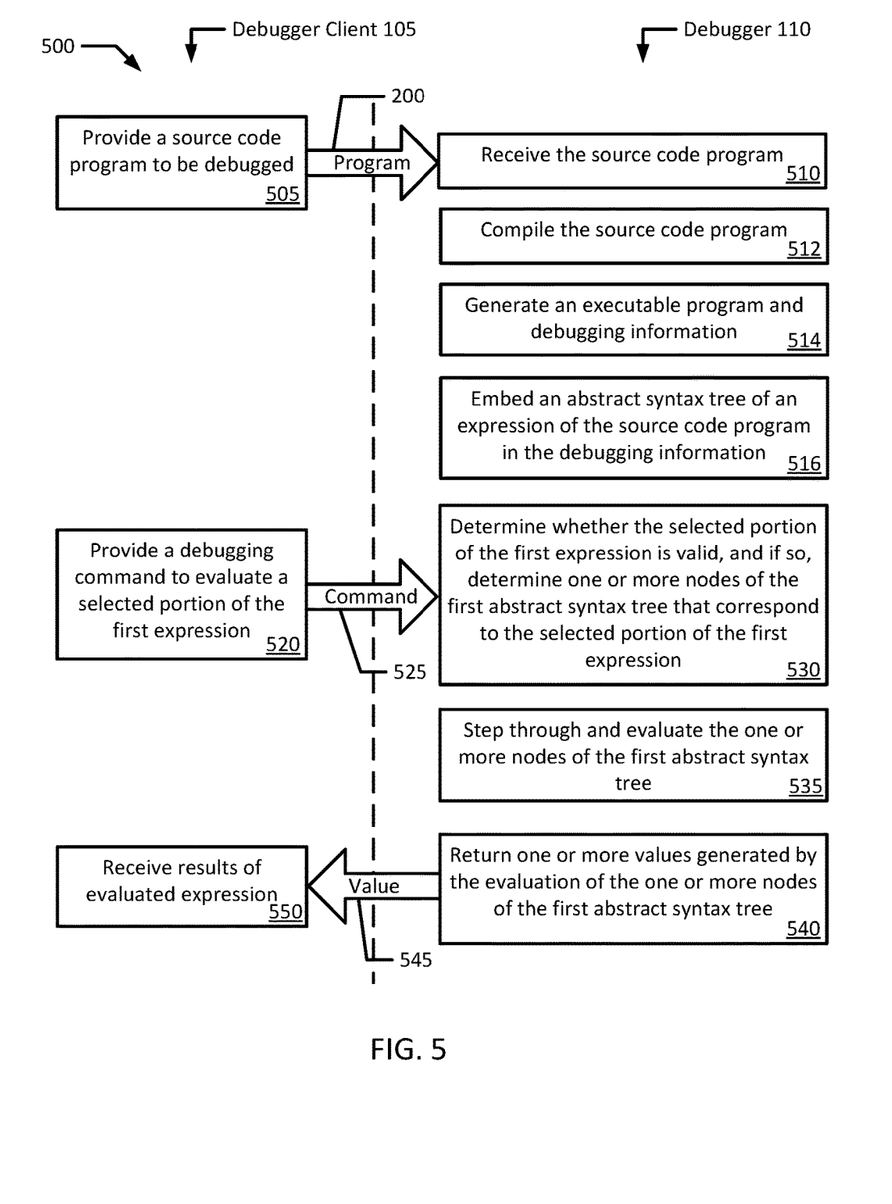
FIG. 5 is a flow diagram illustrating an example process for expression evaluation at debug time according to an example of the present disclosure.

FIG. 5 illustrates a flow diagram of an example method 500 for expression evaluation at debug time in accordance with an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

In the illustrated example, a debugger client 105 provides a source code program 200 to be debugged to the debugger 110 (block 505). The debugger 110 receives the source code program 200 (block 510). The debugger 110 then compiles the source code program 200 (using a compiler 120) (block 512). The debugger 110 generates an executable program 205 and debugging information 210 (block 514). The debugger 110 then embeds in the debugging information 210 at least a first abstract syntax tree 300 of a first expression 305 of the source code program 200 (block 516). The debugger client 105 then provides a debugging command 525 to evaluate a selected portion of the first expression 305 (block 520). The debugger 110 determines whether the selected portion of the first expression 305 is valid, and if so, determine one or more nodes of the first abstract syntax tree 300 that correspond to the selected portion of the first expression 305 (block 530). In an example, if the debugger 110 determines that the selected portion of the first expression 305 is not valid, it will return an error to the debugger client 105 indicating that the selection or the debugging command is invalid. If the selected portion of the first expression 305 is valid, the debugger 110 will then step through and evaluate the one or more nodes of the first abstract syntax tree 300 (block 535). The debugger 110 then returns to the debugger client 105 one or more values 545 generated by the evaluation of the one or more nodes of the first abstract syntax tree 300 (blocks 540). The debugger client 105 receives the one or more values 545 that are the result of the evaluated expression (block 550).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system for expression evaluation at debug time, comprising:
   a memory;
   one or more processors, in communication with the memory; and
   a debugger, executing on the one or more processors, including:
   a user interface module; and
   a debugger engine,
     wherein the one or more processors:
   receive, from a compiler, an executable program with debugging information, wherein the executable program with the debugging information is generated by compiling, by the compiler, a source code program and generating, by the compiler, debugging information corresponding to the executable program, and wherein the compiler embeds at least a first abstract syntax tree of a first expression of the source code program in the debugging information;
   receive, by the user interface module, a first debugging command from a debugger client to evaluate a selected portion of the first expression;
   determine, by the debugger, one or more nodes of the abstract syntax tree that correspond to the selected portion of the first expression;
   step through and evaluate, by the debugger, the one or more nodes of the abstract syntax tree; and
   return, by the debugger, one or more values generated by the evaluation of the one or more nodes of the abstract syntax tree.

2. The system of claim 1, wherein the source code program is in a programming language selected from the group consisting of: Java, C, C++, C-sharp, Visual Basic, SQL, Pascal, COBOL, BPEL, BPMN, CEP, jBPM, and Drools.

3. The system of claim 2, wherein the executable program is selected from the group consisting of: ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, and Zilog Z80 assembly.

4. The system of claim 1, wherein the selected portion of the first expression is the entirety of the first expression.

5. The system of claim 1, wherein determining the one or more nodes of the abstract syntax tree that correspond to the selected portion of the first expression includes analyzing, by the debugger, a data structure, wherein the data structure includes a mapping between the abstract syntax tree and the first expression.

6. The system of claim 1, wherein stepping through and evaluating the one or more nodes of the abstract syntax tree includes determining, by the debugger, whether a first node of the one or more nodes is at least one of a function call and a variable.

7. The system of claim 6, wherein responsive to the debugger determining that the first node is a function call, causing, by the debugger, the function call to be executed.

8. The system of claim 1, wherein the compiler executes on the one or more processors.

9. The system of claim 1, wherein embedding the abstract syntax tree in the debugging information includes embedding at least one sub-tree of the abstract syntax tree that is evaluated as at least one of the one or more nodes of the abstract syntax tree.

10. A method for expression evaluation at debug time, comprising:
    receiving, from a compiler, an executable program with debugging information, wherein the executable program with the debugging information is generated by compiling, by the compiler, a source code program and generating, by the compiler, debugging information corresponding to the executable program, and wherein the compiler embeds at least a first abstract syntax tree of a first expression of the source code program in the debugging information;
    receiving, by a user interface module executing on one or more processors, a first debugging command from a debugger client to evaluate a selected portion of the first expression;
    determining, by a debugger executing on the one or more processors, one or more nodes of the abstract syntax tree that correspond to the selected portion of the first expression;
    stepping through and evaluating, by the debugger, the one or more nodes of the abstract syntax tree;
    returning, by the debugger, one or more values generated by the evaluation of the one or more nodes of the abstract syntax tree.

11. The method of claim 10, wherein the source code program is in a programming language selected from the group consisting of: Java, C, C++, C-sharp, Visual Basic, SQL, Pascal, COBOL, BPEL, BPMN, CEP, jBPM, and Drools.

12. The method of claim 11, wherein the executable program is selected from the group consisting of: ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, and Zilog Z80 assembly.

13. The method of claim 10, wherein the selected portion of the first expression is the entirety of the first expression.

14. The method of claim 10, wherein determining the one or more nodes of the abstract syntax tree that correspond to the selected portion of the first expression includes analyzing, by the debugger, a data structure, wherein the data structure includes a mapping between the abstract syntax tree and the first expression.

15. The method of claim 10, wherein stepping through and evaluating the one or more nodes of the abstract syntax tree includes determining, by the debugger, whether a first node of the one or more nodes is at least one of a function call and a variable.

16. A computer-readable non-transitory storage medium storing executable instructions for expression evaluation at debug time, which when executed by a computer system, cause the computer system to:
    receive, from a compiler, an executable program with debugging information, wherein the executable program with the debugging information is generated by compiling, by the compiler, a source code program and generating, by the compiler, debugging information corresponding to the executable program, and wherein the compiler embeds at least a first abstract syntax tree of a first expression of the source code program in the debugging information;
    receive, by a user interface module executing on one or more processors, a first debugging command from a debugger client to evaluate a selected portion of the first expression;

determine, by a debugger executing on the one or more processors, one or more nodes of the abstract syntax tree that correspond to the selected portion of the first expression;

step through and evaluate, by the debugger, the one or more nodes of the abstract syntax tree;

return, by the debugger, one or more values generated by the evaluation of the one or more nodes of the abstract syntax tree.

17. The computer-readable non-transitory storage medium of claim 16, wherein the source code program is in a programming language selected from the group consisting of: Java, C, C++, C-sharp, Visual Basic, SQL, Pascal, COBOL, BPEL, BPMN, CEP, jBPM, and Drools.

18. The computer-readable non-transitory storage medium of claim 17, wherein the executable program is selected from the group consisting of: ARM architecture assembly, Atmel AVR assembly, x86 assembly, Freescale 68HC11 assembly, Freescale v4e assembly, Motorola 680x0 assembly, MIPS assembly, PowerPC assembly, IBM System z assembly, TI MSP430 assembly, and Zilog Z80 assembly.

19. The computer-readable non-transitory storage medium of claim 16, wherein the selected portion of the first expression is the entirety of the first expression.

20. The computer-readable non-transitory storage medium of claim 16, wherein determining the one or more nodes of the abstract syntax tree that correspond to the selected portion of the first expression includes analyzing, by the debugger, a data structure, wherein the data structure includes a mapping between the abstract syntax tree and the first expression.

21. The computer-readable non-transitory storage medium of claim 16, wherein stepping through and evaluating the one or more nodes of the abstract syntax tree includes determining, by the debugger, whether a first node of the one or more nodes is at least one of a function call and a variable.

\* \* \* \* \*